United States Patent
Comte et al.

(10) Patent No.: US 10,160,685 B2
(45) Date of Patent: Dec. 25, 2018

(54) NON-OPAQUE ARSENIC-FREE BETA-SPODUMENE GLASS CERAMIC EXHIBITING BROWN-GREY COLORATION

(71) Applicant: EUROKERA, Chateau-Thierry (FR)

(72) Inventors: Marie Jacqueline Monique Comte, Fontenay aux Roses (FR); Cécile Jousseaume, Paris (FR); Philippe Lehuede, Dammarie-les-Lys (FR); Kamila Plevacova, Courbevoie (FR)

(73) Assignee: EUROKERA, Chateau-Thierry (FR)

(*) Notice: Subject to any disclaimer, the term of this patent is extended or adjusted under 35 U.S.C. 154(b) by 0 days.

(21) Appl. No.: 15/416,034

(22) Filed: Jan. 26, 2017

(65) Prior Publication Data

US 2017/0129799 A1  May 11, 2017

Related U.S. Application Data (62) Division of application No. 14/193,868, filed on Feb. 28, 2014, now Pat. No. 9,593,040.

(60) Provisional application No. 61/770,499, filed on Feb. 28, 2013.

(30) Foreign Application Priority Data

Feb. 28, 2013 (FR) ..................... 13 51769

(51) Int. Cl.
| | | |
|---|---|---|
| C03B 32/02 | (2006.01) | |
| C03C 10/12 | (2006.01) | |
| C03C 10/00 | (2006.01) | |
| C03C 3/087 | (2006.01) | |
| C03C 4/02 | (2006.01) | |
| C03C 3/085 | (2006.01) | |
| H05B 3/74 | (2006.01) | |
| F24C 15/10 | (2006.01) | |

(52) U.S. Cl.
CPC .............. C03B 32/02 (2013.01); C03C 3/085 (2013.01); C03C 3/087 (2013.01); C03C 4/02 (2013.01); C03C 10/0027 (2013.01); H05B 3/74 (2013.01); *C03C 2204/00* (2013.01); *F24C 15/10* (2013.01)

(58) Field of Classification Search
CPC .................................................. C03C 10/0027
See application file for complete search history.

(56) References Cited

U.S. PATENT DOCUMENTS

| | | |
|---|---|---|
| 4,211,820 A | 7/1980 | Cantaloupe et al. |
| 4,461,839 A | 7/1984 | Rittler |
| 4,526,872 A | 7/1985 | Andrieu et al. |
| 5,446,008 A | 8/1995 | Krolla et al. |
| 6,515,263 B2 | 2/2003 | Mitra et al. |
| 7,465,686 B2 | 12/2008 | Comte |
| 8,053,381 B2 | 11/2011 | Siebers et al. |
| 9,593,040 B2 | 3/2017 | Comte et al. |
| 2002/0026932 A1 | 3/2002 | Mitra et al. |
| 2005/0252503 A1 | 11/2005 | Siebers et al. |
| 2007/0149379 A1 | 6/2007 | Hsu et al. |
| 2007/0213192 A1 | 9/2007 | Comte et al. |
| 2007/0259767 A1 | 11/2007 | Siebers et al. |
| 2008/0026927 A1 | 1/2008 | Comte |
| 2009/0286667 A1 | 11/2009 | Siebers et al. |
| 2011/0226231 A1 | 9/2011 | Siebers et al. |
| 2012/0035041 A1 | 2/2012 | Comte |
| 2013/0201678 A1 | 8/2013 | Siebers et al. |

FOREIGN PATENT DOCUMENTS

| | | |
|---|---|---|
| DE | 102008001708 B9 | 4/2010 |
| GB | 1246694 A1 | 9/1971 |
| JP | 64052631 A | 2/1989 |
| WO | 2014035791 A1 | 3/2014 |

OTHER PUBLICATIONS

English Translation of JP2015559567 Office Action dated Sep. 12, 2017, Japan Patent Office.
English Translation of CN201480023928.X First Office Action dated Feb. 4, 2017, China Patent Office.
International Search Report and Written Opinion of the International Searching Authority; PCT/ID2014/000228; dated Jan. 20, 2015; 18 Pages.

*Primary Examiner* — Karl E Group
(74) *Attorney, Agent, or Firm* — Dinsmore & Shohl LLP (57) ABSTRACT

Methods, compositions, and articles provide for LAS-type glass-ceramics having specific thermo-mechanical, optical and coloration characteristics to yield generally brown-grey products. The glass-ceramic materials may include as colorants iron oxide, vanadium oxide, chromium oxide, cobalt oxide, nickel oxide and/or cerium oxide.

11 Claims, 2 Drawing Sheets

NON-OPAQUE ARSENIC-FREE BETA-SPODUMENE GLASS CERAMIC EXHIBITING BROWN-GREY COLORATION

CROSS-REFERENCE TO RELATED APPLICATIONS

This application is a divisional of and claims the benefit of priority under 35 U.S.C. § 120 of U.S. application Ser. No. 14/193,868 filed on Feb. 28, 2014, now U.S. Pat. No. 9,593,040, which claims the benefit of priority under 35 U.S.C. § 119 of U.S. Application Ser. No. 61/770,499 filed on Feb. 28, 2013, and French Patent Application Serial No. FR 1351769 filed on Feb. 28, 2013, the entire contents of which are hereby incorporated by reference.

BACKGROUND

The present disclosure relates to glass-ceramics of the lithium aluminosilicate (LAS) type, having a generally brown-grey color and containing a solid solution of beta-spodumene as the predominant crystalline phase. The disclosure also relates to articles made from such glass-ceramics, precursor glasses for such glass-ceramics, and methods for obtaining such glass-ceramics and related articles.

SUMMARY

One of the desirable properties of glass-ceramic materials is their thermo-mechanical ability to sustain repeated and rapid temperature changes up to very high temperatures, which can be as high as 600-800° C. Although originally developed for other purposes, LAS type glass-ceramics have become the material of choice for certain products in the domestic market, such as glass-ceramic cooktops. The thermo-mechanical properties of LAS type glass ceramics dovetail nicely with the use of this material in cooktop applications.

Many such cooktops employ radiant elements or other heating elements beneath a top surface of the glass-ceramic. Consequently, to be effective, the glass-ceramic material should exhibit the additional properties of: good transmission efficiency in the visible and infrared spectrums, very low coefficient of thermal expansion (CTE), and optionally particular coloration properties in reflection (defined by the parameters L*, a* and b*).

Thus, properties of a viable glass-ceramic material for use in the domestic market, such as for cooktops, involve aesthetic considerations. Although aesthetics are often dismissed as unimportant by some, such considerations are as important as performance characteristics so far as marketability is concerned. For example, in the domestic market, the color of a glass-ceramic material may be the deciding factor as to whether a product is commercially sustainable.

In terms of aesthetic considerations, specifically color, the state of the cooktop art offers three options: transparent black glass-ceramic (with lightness, L*, below 25), white glass-ceramic (with lightness L* higher than 60), and non-colored transparent glass-ceramic with an opaque decorative layer on a backside thereof to provide a desirable color and/or to obscure internal components, such as electrical components, beneath the cooktop. Notably, however, until now there have been no commercial products exhibiting a generally brown-grey coloration with a range of lightness L* between about 25 to 45, good transmission efficiency in the visible and infrared spectrums, and a very low coefficient of thermal expansion (CTE).

It is noted that although cooktops are one use for the one or more glass-ceramic embodiments disclosed herein, the contemplated applications may extend to other areas, including cooking utensils, cookware, pots, pans, microwave oven floors, etc., as well as to packaging for consumer electronics, for example. Optionally, a cooktop comprising the glass-ceramic may be coated or partially coated with an enamel décor.

Accordingly, there are needs in the art for new methods and apparatus for providing glass-ceramic of desirable aesthetic and performance characteristics.

BRIEF DESCRIPTION OF THE FIGURES

For the purposes of illustration, there are forms shown in the drawings that are presently preferred, it being understood, however, that the embodiments disclosed and described herein are not limited to the precise arrangements and instrumentalities shown.

DETAILED DESCRIPTION

General Considerations

The present disclosure relates to the field of glass-ceramics. It relates more particularly to glass-ceramics exhibiting a specific appearance in reflection and also a controlled transmittance curve, and also to articles made of such glass-ceramics, in particular cooktops, and to the precursor glasses of such glass-ceramics.

While the production of glass ceramics has been carried out for many years, the engineering parameters for producing a generally brown-grey glass ceramic of specific lightness, L*, transmission, and coefficient of thermal expansion (CTE) have until now been elusive in the art. In this regard, a discussion is provided herein of the requisite processes, compositions, and/or other parameters for producing the aforementioned glass-ceramics.

A glass-ceramic is a polycrystalline material produced via a ceramming process (i.e., a controlled rather than spontaneous crystallization) of a precursor glass. The general process for producing a glass-ceramic material involves three basic steps: (i) forming a precursor glass via appropriate melting (and fining) processes; (ii) cooling and shaping the precursor glass into a desired form; and (iii) ceramming (heat treatment), wherein the precursor glass partly crystallizes and forms a glass-ceramic.

In an application as a cooktop, in particular for heating devices of the radiant type, it may be desirable for the cooktop to meet certain requirements with regard to its optical properties, both in the visible region and in the infrared region. For instance, it may be desirable for the heating elements to be concealed when not operating but to be clearly visible when they are operating. The energy efficiency of the device is important in order to reduce as much as possible the time for cooking and energy consumption. The esthetic appearance of the cooktop is also a parameter to be taken into account, in particular for a cooktop to be fully integrated in consumer kitchens.

Conventional glass-ceramic cooktops on the market are glass-ceramics of the lithium aluminosilicate type comprising a crystal phase essentially composed of a solid solution of β-quartz. They are typically transparent but have a very low light transmittance and exhibit a black appearance, which is compatible with the majority of kitchens. It can be advantageous, in order to further improve this incorporation, to have available cooktops exhibiting other appearances. In particular, cooktops having a grey color may be desired.

Transparent glass-ceramics comprising a solid solution of β-quartz as a main crystal phase have proved to be unsuited to the achievement of such optical appearances because of their very low light transmittance (set by the application). Such materials appear black, whatever their true color in transmittance.

In order to obtain other colors, one possible approach is to coat a surface (e.g., a lower surface) of a clear glass-ceramic with a colored coating, for example made of a heat-resistant resin or enamel. However, few resins are compatible with the high temperatures experienced by the cooktop in the case of radiant heating. In addition, the deposition of resin or enamel involves a costly additional step in the process for the manufacture of the cooktops. There thus exists a need to have available cooktops which are suitable for radiant heating and which exhibit the desired optical appearance without having to add a resin or an enamel over the whole surface of the cooktop.

Glass-Ceramic System

A wide variety of glass-ceramic systems exist, e.g., the $Li_2O \times Al_2O_3 \times nSiO_2$-System (LAS system), the $MgO \times Al_2O_3 \times nSiO_2$-System (MAS system), and the $ZnO \times Al_2O_3 \times nSiO_2$-System (ZAS system), to name a few.

The system used in connection with the embodiments disclosed herein is the $Li_2O \times Al_2O_3 \times nSiO_2$-System (LAS system). The LAS system mainly refers to a mix of lithium oxide, aluminum oxide, and silicon oxide with additional components, e.g., glass-phase forming agents such as $ZrO_2$, $TiO_2$, $MgO$, $ZnO$, $BaO$, $SrO$, $CaO$, $K_2O$, $Na_2O$, $P_2O_5$, $B_2O_3$, $V_2O_5$, $Fe_2O_3$, $Cr_2O_3$, $CoO$, $NiO$, $CeO_2$, $MnO$, $Bi_2O_3$ and/or $SnO_2$.

In most cases, nucleation agents and fining agents are added to the precursor glass composition. Nucleation agents aid and control the crystallization process and the fining agents are employed to remove gas bubbles from the glass melt. By way of example, one or more embodiments herein may employ $ZrO_2$ and/or $TiO_2$ as nucleation agents in the precursor glass process.

Many conventional precursor glass compositions may employ arsenic oxide ($As_2O_3$) and/or antimony oxide ($Sb_2O_3$) as fining agents during the step of melting a vitrifiable load of raw materials into a precursor glass. In connection with the protection of the environment, it is desired to avoid the use of $As_2O_3$ and $Sb_2O_3$, which are highly toxic compounds. Some prior work has been done in connection with producing glass-ceramics without arsenic and/or antimony in the composition, at processing temperatures, times, atmospheres, etc., suitable to achieve desirable transmission, lightness, CTE, etc. However, one skilled in the art will learn from the disclosure herein that one cannot indiscriminately substitute fining agents and expect that the coloration of the resultant glass-ceramic will not be affected. Indeed, significant care must be taken as to process parameters and compositions in order to arrive at a desired brown-grey coloration.

By way of example, one or more embodiments herein may employ tin oxide ($SnO_2$) as a fining agent in the precursor glass process. Tin oxide is a more powerful reducing agent than alternatives such as arsenic trioxide and antimony trioxide, and therefore its influence on the coloration and optical transmission properties of the glass-ceramic is different from that of the other compounds. Indeed, although $SnO_2$ may have an initial function as a fining agent, the presence of the compound may indirectly affect coloring and light transmission of the glass-ceramic by reducing colorants such as vanadium oxide ($V_2O_5$) and iron oxide ($Fe_2O_3$) present during ceramming. It is advisable to minimize, indeed even to avoid, any phenomenon of devitrification and to control the influence of $SnO_2$ on the optical transmittance and the optical reflection. The effects of $V_2O_5$ and $Fe_2O_3$ on coloration will be discussed in more detail later herein.

It is not excluded from the composition of the glass-ceramics to comprise, in a more or less significant amount, in addition to $V_2O_5$, $Fe_2O_3$, $MnO$, $Bi_2O_3$ and $Cr_2O_3$, at least one additional colorant, such as $CoO$, $CuO$, $MnO_2$, $NiO$ or $CeO_2$. However, the presence of such an additional colorant should not significantly influence the targeted optical transmittance curve and the targeted appearance in reflection.

Thus, $CoO$ can a priori be present only in a very low amount in so far as this component strongly absorbs in the infrared and not insignificantly at 625 nm and confers a blue coloring in reflection. In embodiments, the chemical composition of the glass-ceramic comprises less than 200 ppm, e.g., less than 100 ppm, 50 ppm, 30 ppm or 0 ppm of cobalt oxide.

Likewise, the $NiO$ content is at most 500 ppm, in particular 200 ppm, indeed even zero, with the exception of inevitable traces. The $CeO_2$ content is at most 0.5%, in particular 0.1%, indeed even zero, except for inevitable impurities. The $MnO_2$ content is at most 0.5%, in particular 0.1%, indeed even zero, except for inevitable impurities. The $CuO$ content is preferably at most 500 ppm, in particular 200 ppm, indeed even zero, except for inevitable impurities.

In embodiments, the composition of the glass-ceramics does not comprise refining aids, such as F and Br. With the exception of inevitable traces, it does not comprise F or Br. This is particularly advantageous in the light of the price and toxicity of these compounds.

After crystallization, the dominant crystal-phase in LAS type glass-ceramic is a high-quartz solid solution, and when the glass-ceramic is subjected to a more intense heat treatment, the high-quartz solid solution transforms into a keatite-solid solution (which is sometimes called beta-spodumene). This transition is non-reversible and reconstructive, which means that bonds in the crystal-lattice are broken and new bonds are arranged.

In an LAS type glass-ceramic, it is possible to adjust the coefficient of thermal expansion (CTE) over a wide range by adjusting the initial glass composition, the nature and amount of the crystalline phases and the amount and composition of the residual glass. For purposes of one or more embodiments herein, a low or even zero CTE is desired, which may be obtained by controlling the ceramming heat treatment process to balance the negative and positive CTE contributions of the dominant crystalline phase of the LAS glass-ceramic and residual glass phase(s). Once again, however, one cannot indiscriminately adjust the ceramming temperatures to account for desired CTE without considering the effect that such may have on the coloration and/or transmission of the resultant glass-ceramic. Indeed, it has been discovered that the ceramming temperatures have a significant effect on the lightness, L*, and the color of the resultant glass-ceramic.

In view of the foregoing, various embodiments have been discovered that provide for glass-ceramics, free of arsenic and/or of antimony, having very desirable integrated visible transmission, optical transmission, infra-red transmission, coefficient of thermal expansion, lightness, and coloration.

To this end, the subject matter of the disclosure, according to embodiments, relates to a glass-ceramic of the lithium aluminosilicate type comprising a solid solution of β-spodumene and exhibiting, for a thickness of 4 mm;

a light transmittance within a range extending from 0.3 to 2% or from 0.3 to 6%, in particular from 0.6 to 1.7%, an optical transmittance for a wavelength of 625 nm of greater than 1.0%, or 2.0%, in particular of greater than 3.0%, an optical transmittance for a wavelength of 950 nm within a range extending from 35 to 75% or from 50 to 75%, an optical transmittance for a wavelength of 1600 nm of at least 45%, in particular at least 50%, and L*, a*, b* colorimetric coordinates in diffuse reflection for an illuminant D65 and a reference observer at 2° such that: $15.0 \leq L^* \leq 40.0$, $-3.0 \leq a^* \leq 3.0$ and $-10.0 \leq b^* \leq 3.0$.

In embodiments, the glass-ceramic has an optical transmittance for a wavelength of 450 nm of less than 0.1%.

Such glass-ceramics may comprise the following constituents, varying within the limits by weight defined below:

| | |
|---|---|
| $SnO_2$ | 0.2-0.6%, e.g., 0.25-0.5%; |
| $V_2O_5$ | 0.015-0.06%, e.g., 0.015-0.05%; |
| $Cr_2O_3$ | 0.01-0.04% or $Bi_2O_3$ 0.05-3.0% or MnO 0-1%; |
| $Fe_2O_3$ | 0.05-<0.15%; and |
| $As_2O_3 + Sb_2O_3$ | <0.1%, e.g., <0.05%. |

In embodiments, the solid solution of β-spodumene represents at least 20% by weight, in particular 30% by weight or 40% by weight, of the total crystalline fraction. The glass-ceramic comprises a solid solution of β-spodumene as main crystal phase. In some cases, the solid solution of β-spodumene can represent more than 50% by weight, in particular 60% by weight and even 70% by weight or 80% by weight of the total crystalline fraction. The glass-ceramic can even sometimes comprise a solid solution of β-spodumene as the sole crystal phase, though in addition to the solid solution of β-spodumene, the glass-ceramic can comprise a solid solution of β-quartz. The crystalline fraction can thus, in embodiments, comprise a mixture of a solid solution of β-spodumene and of a solid solution of β-quartz, in proportions by weight of at least 20:80, in particular 40:60, indeed even 50:50 and even 60:40 or 70:30. In some cases, this proportion can even be at least 80:20, 90:10 or 95:5. The amounts of a given crystal phase can be determined in x-ray diffraction by the Rietveld method. The crystal fraction normally represents at least 60% by weight, in particular 70% by weight and even 75% by weight of the glass-ceramic.

EXPERIMENTS

In connection with the development of the embodiments herein, a number of experiments were conducted on numerous samples of material. In particular, a number of glass samples of varying composition were subject to ceramming at different temperatures in order to evaluate the aforementioned characteristics.

Glass Compositions

Figure 1:
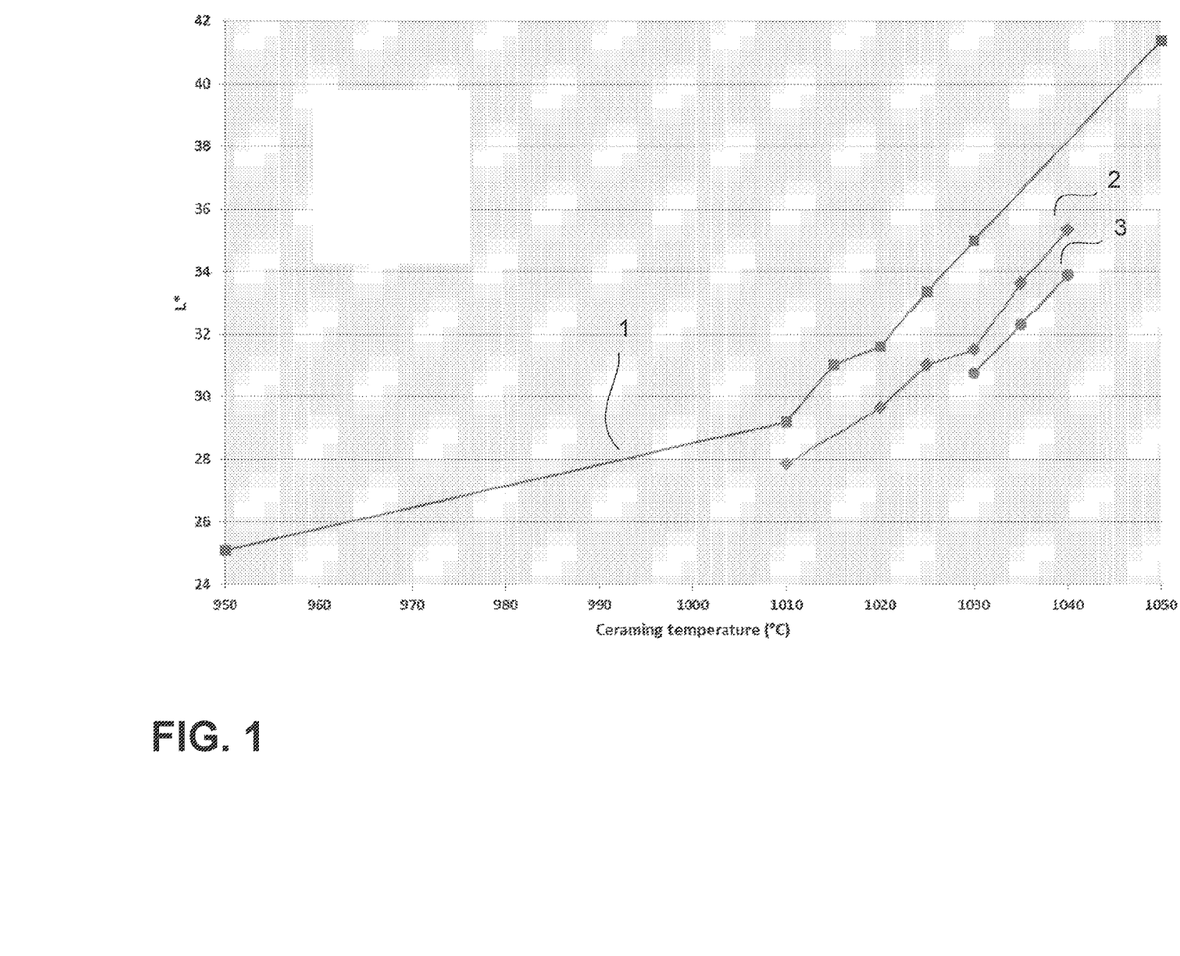
FIG. 1 is a chart illustrating the relationship between lightness L* of the glass ceramic materials produced and the specific maximum ceramming temperature employed in forming same in accordance with one or more embodiments described and/or disclosed herein.

The specific glass compositions utilized to produce the precursor glasses, and/or glass-ceramic materials of the examples herein are listed in the table shown in FIG. 1. The compositions all belong to the LAS system with the following preferred composition ranges (in weight %): 60-72% $SiO_2$, 18-23% $Al_2O_3$, 2.5-4.5% $Li_2O$, 0-2.5% $ZrO_2$, 1.5-4% $TiO_2$, 0-3% MgO, 0-3% ZnO, 0-5% BaO, 0-5% SrO (with $0 \leq BaO+SrO \leq 5$), 0-2% CaO, 0-1.5% $K_2O$, 0-1.5% $Na_2O$ (optionally with $0 \leq CaO+K_2O+Na_2O \leq 1.5$ or 1.25 or 1.0), 0-5% $P_2O_5$, 0-2% $B_2O_3$, 0-0.3% $V_2O_5$, 0.12-0.4% $Fe_2O_3$, 0.01-0.04% $Cr_2O_3$, 0-0.05% CoO, 0-0.3% NiO, 0-1% MnO, 0.05-3% $Bi_2O_3$, 0-0.2% $CeO_2$, and/or 0-0.6% $SnO_2$.

Further example composition ranges (in weight %) include: 60-72% $SiO_2$; 18-23% $Al_2O_3$; 2.5-4.5% $Li_2O$; 0-3% MgO; 1-3% ZnO; 1.5-4% $TiO_2$; 0-2.5% $ZrO_2$; 0-5% BaO; 0-5% SrO; with BaO+SrO 0-5%; 0-2% CaO; 0-1.5% $Na_2O$; 0-1.5% $K_2O$; 0-5% $P_2O_5$; and 0-2% $B_2O_3$.

The $ZrO_2$ and $TiO_2$ components are used for nucleation, and the $SnO_2$ is used as a fining component.

The content by weight of MgO, if used, is at most 2%, e.g., at most 1%. If used, the content by weight of CaO is at most 1%. The sum of contents by weight of $Na_2O$ and $K_2O$ is, in embodiments, at most 1%, e.g., at most 0.5%. The content by weight of BaO, if used, is at most 3%, e.g., at most 2% or at most 1%. These different example ranges, alone or in combination, may be employed to decrease the thermal expansion coefficient of the glass-ceramic.

The $V_2O_5$, $Fe_2O_3$, $Cr_2O_3$, CoO, NiO, MnO, $Bi_2O_3$ and/or $CeO_2$ are used for coloring. $Fe_2O_3$ and $Cr_2O_3$ were specifically chosen to develop a brown-grey coloration after ceramming.

Table 4 is a table of compositions suitable for use as a glass precursor, and/or a glass-ceramic material in accordance with one or more embodiments described and/or disclosed herein.

TABLE 4

| Oxides (Weight) | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| $SiO_2$ | 64.81 | 64.62 | 64.62 | 64.65 | 64.61 | 65.57 | 65.57 | 65.62 | 67.16 | 67.22 | 66.52 | 67.52 |
| $Al_2O_3$ | 20.8 | 20.8 | 20.8 | 20.8 | 20.8 | 20.8 | 20.8 | 20.8 | 19.2 | 19.2 | 20.8 | 20.8 |
| $Li_2O$ | 3.8 | 3.8 | 3.8 | 3.8 | 3.8 | 3.8 | 3.8 | 3.8 | 3.5 | 3.5 | 3.8 | 3.8 |
| MgO | 0.35 | 0.35 | 0.35 | 0.35 | 0.35 | 0.35 | 0.35 | 0.35 | 1.3 | 1.3 | 0.35 | 0.35 |
| ZnO | 1.5 | 1.5 | 1.5 | 1.5 | 1.5 | 1.5 | 1.5 | 1.5 | 1.7 | 1.7 | 1.5 | 1.5 |
| BaO | 2.5 | 2.5 | 2.5 | 2.5 | 2.5 | 2.5 | 2.5 | 2.5 | 1.8 | 1.8 | 1.5 | 0.5 |
| $TiO_2$ | 3 | 3 | 3 | 3 | 3 | 3 | 3 | 3 | 3 | 3 | 3 | 3 |
| $ZrO_2$ | 1.4 | 1.4 | 1.4 | 1.4 | 1.4 | 1.4 | 1.4 | 1.4 | 1.4 | 1.4 | 1.4 | 1.4 |
| $SnO_2$ | 0.35 | 0.35 | 0.35 | 0.35 | 0.35 | 0.35 | 0.35 | 0.35 | 0.35 | 0.35 | 0.35 | 0.35 |

TABLE 4-continued

| Oxides (Weight) | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| $K_2O$ | 0.25 | 0.25 | 0.25 | 0.25 | 0.25 | | | | 0.1 | 0.1 | | |
| $Na_2O$ | 0.6 | 0.6 | 0.6 | 0.6 | 0.6 | | | | 0.2 | 0.2 | | |
| CaO | 0.4 | 0.4 | 0.4 | 0.4 | 0.4 | 0.4 | 0.4 | 0.4 | | | 0.4 | 0.4 |
| $V_2O_5$ | 0.062 | 0.167 | 0.11 | 0.13 | 0.167 | 0.062 | 0.062 | 0.062 | 0.025 | 0.015 | 0.072 | 0.072 |
| CoO | 0.0013 | 0.0013 | 0.0013 | 0.0013 | 0.0013 | | | | | | | |
| $Fe_2O_3$ | 0.160 | 0.250 | 0.300 | 0.250 | 0.250 | 0.250 | 0.250 | 0.200 | 0.250 | 0.200 | 0.280 | 0.280 |
| $Cr_2O_3$ | 0.0173 | 0.0173 | 0.0173 | 0.0173 | 0.021 | 0.0173 | 0.022 | 0.022 | 0.2 | 0.2 | 0.26 | 0.26 |
| NiO | | | | | | | | | | | | |
| $CeO_2$ | | | | | | | | | | | | |

Notably, the compositions of Table 4 contain $SnO_2$ as a fining agent. The amount of $SnO_2$ present may be significant in order to achieve the desired fining functionality; however, any devitrification should be minimized or even avoided and the influence of the $SnO_2$ on the integrated optical transmission should be controlled. Indeed, $SnO_2$ is capable of reducing the vanadium oxide and the iron oxide present during ceramming, although due to the high raw material cost for $SnO_2$, its use is advantageously minimized. A $SnO_2$ content of up to about 0.6%, e.g., from about 0.1% to 0.4% by weight may be used. Embodiments herein contain one of: (i) from about 0.1% to about 0.3% by weight of $SnO_2$; (ii) from about 0.2% to about 0.3% by weight of $SnO_2$; and (iii) about 0.2% to about 0.4% by weight.

Accordingly, the disclosed glass-ceramics contain neither $As_2O_3$ nor $Sb_2O_3$ in any significant amount (i.e., they may contain only traces of one and/or the other of these toxic compounds). If traces of one or the other are present, then such may likely be quantified as $As_2O_3+Sb_2O_3$ is less than about 1000 ppm, i.e., less than 500 ppm.

In embodiments, the glass precursor compositions exhibit the bulk composition of the corresponding glass-ceramic. It may incidentally be noted that the precursor glasses may exhibit an optical transmittance, for any wavelength between 1000 and 2500 nm, of greater than 60% for a thickness of 3 mm.

In embodiments, the sum of the contents of $SiO_2$, $Al_2O_3$, $Li_2O$, MgO, ZnO, $TiO_2$, $ZrO_2$, BaO, SrO, CaO, $Na_2O$, $Li_2O$, $K_2O$, $P_2O_5$, $B_2O_3$, $SnO_2$, $V_2O_5$, $Fe_2O_3$, $Cr_2O_3$, MnO and $Bi_2O_3$ in the glass-ceramic is at least 98%, in particular 99%.

Table 1 summarizes further example glass compositions according to various embodiments. Composition C1 (comparative) comprises neither $Bi_2O_3$ nor $Cr_2O_3$.

Processing Conditions

Each of the samples was subject to the following basic process. First the raw materials were melted by preheating in a furnace at 1550° C., followed by heating for 30 minutes at 1550° C., heating for 60 minutes from 1550° C. to 1650° C., and heating for 360 minutes at 1650° C. Next, the glass was rolled to a thickness of between about 4-6 mm, and then annealed at 650° C. for about 1 hour.

Finally, the samples were cerammed in a static furnace in accordance with the following cycle: (i) rapid heating from room temperature to about 655° C. for about 20 to 40 minutes; (ii) nucleation from about 650° C. to about 820° C. for about 15 to 30 minutes; (iii) heating from about 820° C. to the maximum ceramming temperature for about 10 to 20 minutes (notably, the maximum ceramming temperature can vary from about 950° C. to about 1060° C.); (iv) crystallization at the maximum ceramming temperature for about 5 to 15 minutes; and (v) rapid cooling from about 20 to 40 minutes to room temperature.

By way of further specifics, the thermal cycle may be: (i) rapid heating from room temperature to about 655° C. for about 25 minutes; (ii) heating from about 650° C. to about 820° C. for about 24 minutes; (iii) heating from about 820° C. to the maximum ceramming temperature for about 12 to 15 minutes; (iv) crystallization at the maximum ceramming temperature for about 8 minutes; (v) rapid cooling down to about 900° C. for about 5 minutes; and (vi) rapid cooling (from about 20 to 40) minutes to room temperature.

The ceramization is carried out at temperatures that make possible the development of a solid solution of β-spodumene. The ceramization temperature, which can vary as a function of the glass matrix, can be chosen using differential thermal analysis, which can be used to determine the crys-

TABLE 1

| | C1 | S1 | S2 | S3 | S4 | S5 | S6 | S7 |
|---|---|---|---|---|---|---|---|---|
| $SiO_2$ | 65.53 | 65.45 | 65.02 | 65.20 | 65.59 | 65.57 | 65.55 | 65.49 |
| $Al_2O_3$ | 20.48 | 20.65 | 20.48 | 20.48 | 20.48 | 20.69 | 20.68 | 20.48 |
| $Li_2O$ | 3.75 | 3.75 | 3.75 | 3.75 | 3.75 | 3.76 | 3.76 | 3.75 |
| $Na_2O$ | 0.56 | 0.60 | 0.56 | 0.56 | 0.28 | 0.3 | 0.6 | 0.28 |
| $K_2O$ | 0.23 | 0.22 | 0.23 | 0.23 | 0.12 | 0.12 | 0.22 | 0.12 |
| MgO | 0.24 | 0.37 | 0.24 | 0.24 | 0.24 | 0.37 | 0 | 0.24 |
| ZnO | 1.51 | 1.52 | 1.51 | 1.51 | 1.51 | 1.52 | 1.52 | 1.51 |
| BaO | 2.55 | 2.46 | 2.55 | 2.55 | 2.55 | 2.46 | 2.46 | 2.55 |
| CaO | 0.36 | 0.45 | 0.36 | 0.36 | 0.36 | 0.45 | 0.45 | 0.36 |
| $TiO_2$ | 3.02 | 2.96 | 3.02 | 3.02 | 3.02 | 2.97 | 2.97 | 3.02 |
| $ZrO_2$ | 1.35 | 1.30 | 1.35 | 1.35 | 1.35 | 1.3 | 1.3 | 1.35 |
| $SnO_2$ | 0.29 | 0.31 | 0.29 | 0.29 | 0.29 | 0.31 | 0.31 | 0.29 |
| $V_2O_5$ | 0.0171 | 0.0355 | 0.0200 | 0.0200 | 0.0200 | 0.0355 | 0.0355 | 0.02 |
| $Fe_2O_3$ | 0.0804 | 0.1220 | 0.1200 | 0.1200 | 0.1200 | 0.1220 | 0.1220 | 0.12 |
| $Cr_2O_3$ | | 0.0215 | | 0.0200 | 0.0200 | 0.0215 | 0.0215 | 0.02 |
| $Bi_2O_3$ | | | 0.50 | 0.30 | 0.30 | | | |
| CoO | 0.0289 | 0.0015 | | | | 0.0015 | 0.0015 | |
| MnO | | | | | | | | 0.4 | tallization temperature of the β-quartz phase and then, at a higher temperature, of the temperature at which the transformation (irreversible) of β-quartz into 0-spodumene takes place. The ceramization temperature, according to various embodiments, is at least 950° C., e.g., 970° C., 1000° C. or 1020° C.

Experimental Results

Table 5 is a table showing certain characteristics of each glass-ceramic sample as well as the associated maximum ceramming temperature. Notably, the maximum ceramming temperature varied between about 1025-1040° C. Given the glass composition system discussed above, and given that the ceramming treatment used thermal cycles higher than 950° C., the resulting material of all the samples presented a crystallographic structure that was mainly composed of beta-spodumene glass-ceramic.

TABLE 5

| Properties | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Ceramming temperature (° C.) | | 1040° C. | 1035° C. | 1025° C. | 1035° C. | 1035° C. | 1030° C. | 1040° C. | 1030° C. | 1025° C. | 1030° C. | 1045° C. | 1045° C. |
| CTE ($\times 10^{-7}$/° C.) | | | 13 | | | | 9.4 | | | | | 8.5 | 7.2 |
| Reflected Color Thickness 5.2 mm | L* | 33.94 | 33.64 | 33.38 | 31.31 | 33.3 | 29.83 | 32 | 28.93 | 33.3 | 35.15 | 30.24 | 27.3 |
| | a* | 0.24 | 0.82 | 1.14 | 0.37 | 0.93 | 0.82 | 1.05 | 0.37 | 0.25 | 0.15 | 0.92 | 0.54 |
| | b* | −0.22 | 1.17 | 2.3 | −0.06 | 1.27 | −0.42 | 0.43 | −0.87 | 0.24 | 1.49 | −1.29 | −1.47 |
| Reflected Color Thickness 4 mm | L* | 35.1 | 32.64 | 34.4 | 31.46 | 32.34 | 30.36 | | | | | | |
| | a* | 0.05 | 1.03 | 2.08 | 0.8 | 1.57 | 3.4 | | | | | | |
| | b* | −1.63 | 0.18 | 1.46 | −0.96 | 0.8 | 0.62 | | | | | | |
| Transmission (%) Thickness 4 mm | Tl | 0.49 | 0.98 | 3.84 | 1.06 | 1.69 | 4.87 | | | | | 3.34 | 2.92 |
| | 625 nm | 2.09 | 4.18 | 12.67 | 4.33 | 6.66 | 12.86 | | | | | 10.19 | 9.20 |
| | 950 nm | 53.65 | 50.3 | 54.77 | 53.98 | 53.88 | 55.36 | | | | | 51.79 | 52.62 |
| | 1600 nm | 61.49 | 52.64 | 49.61 | 56.88 | 54.19 | 52.19 | | | | | 46.06 | 46.39 |

Additional glass-ceramic results for the glass compositions from Table 1 are summarized in Tables 2 and 3. Data in Table 2 (as in Table 5) include the type of glass used for the ceramization, the ceramization temperature (denoted T and expressed in ° C.), the stationary-state time at the ceramization temperature (denoted t and expressed in minutes), the thickness of the plate (denoted th and expressed in mm), the transmittance properties at the true thickness calculated from a transmittance spectrum recorded by spectrophotometry, including the light transmittance within the meaning of the standard EN 410 (denoted LT), and the transmittances for a wavelength of 625 nm (denoted T625), of 950 nm (denoted T950) and of 1600 nm (denoted T1600), the L*a*b* colorimetric coordinates in diffuse reflection, calculated from a diffuse reflection spectrum, obtained using a spectrophotometer equipped with an integrating sphere under perpendicular incidence and after subtraction of the specular reflection and of a base line obtained by the same measurement carried out on Spectralon®, and the type of crystals, where Q denotes β-quartz as main crystal phase and S denotes the significant presence of β-spodumene as crystal phase.

TABLE 2

| | A | B | C | D | E |
|---|---|---|---|---|---|
| Glass | S1 | S1 | S1 | C1 | S2 |
| T(° C.) | 930 | 1020 | 1020 | 1020 | 1020 |
| t(min) | 4 | 10 | 12 | 10 | 10 |
| th(mm) | 4.08 | 3.90 | 3.90 | 4.21 | 4.24 |
| LT(%) | 1.1 | 0.85 | 0.62 | 0.86 | 0.40 |
| T625(%) | 3.6 | 3.3 | 3.8 | 34.6 | 22.1 |

TABLE 2-continued

| | A | B | C | D | E |
|---|---|---|---|---|---|
| T950(%) | 61.1 | 60.9 | 59.7 | 66.3 | 51.5 |
| T1600(%) | 65.4 | 64.9 | 64.9 | 62.7 | 66.3 |
| L* | 1.7 | 22.6 | 23.2 | 20.9 | 38.4 |
| a* | 0.1 | −0.5 | −0.5 | 7.7 | 1.8 |
| b* | −0.6 | −2.5 | −2.6 | −19.4 | −7.8 |
| Crystals | Q | S | S | S | S |

| | F | G | H | I | J |
|---|---|---|---|---|---|
| Glass | S3 | S4 | S5 | S6 | S7 |
| T(° C.) | 1020 | 1020 | 1020 | 1020 | 1020 |

-continued

| | F | G | H | I | J |
|---|---|---|---|---|---|
| t(min) | 10 | 10 | 10 | 10 | 10 |
| th(mm) | 3.67 | 4.14 | 3.89 | 3.82 | 4 |
| LT(%) | 1.90 | 1.12 | 0.67 | 1.04 | 0.45 |
| T625(%) | 37.8 | 29.6 | 2.4 | 3.7 | 1.7 |
| T950(%) | 65.9 | 59.7 | 60.1 | 64.3 | 52 |
| T1600(%) | 70.1 | 67.3 | 65.9 | 68.9 | 50.9 |
| L* | 25.3 | 29.9 | 17.0 | 20.1 | 16.5 |
| a* | 0.8 | −1.5 | 1.4 | 1.0 | 0.5 |
| b* | −6.8 | −2.6 | −6.6 | −7.9 | −4.3 |
| Crystals | S | S | S | S | S |

Comparative example A exhibits a black appearance in reflection. As a result of a ceramization temperature which is too low to make possible the growth of crystals of β-spodumene, it is crystallized essentially in the β-quartz form. When the same glass composition is ceramized at a higher temperature (Examples B and C), the transmittance properties are substantially retained but the appearance in diffuse reflection is completely modified, as is evidenced by the higher L* value. These samples exhibit the desired grey color.

In the case of comparative example D, the glass-ceramic having the comparative composition C1, even when ceramized so as to bring about the growth of β-spodumene, the glass-ceramic exhibits a blue color in reflection, characterized by a very negative b* value and an excessively high a* value.

In comparison with examples B and C, example E has both a lower light transmittance and a lighter grey color in reflection. Examples F to I are other examples according to various embodiments.

A further example glass-ceramic (sample R231) was cerammed at a maximum ceramming temperature of 1020° C. for 10 min. The glass-ceramic has the following optical properties and composition (in wt. %): LT: 1.04%, T625: 3.95%, T950: 60.95%, T1600: 65%, L*: 21.64, a*: −0.38, b*: −1.31, $SiO_2$: 64.91%, $Al_2O_3$: 20.73%, $Li_2O$: 3.75%, BaO: 2.45%, ZnO: 1.51%, CaO: 0.44%, MgO: 0.37%, $K_2O$: 0.22%, $Na_2O$: 0.59%, $Fe_2O_3$: 0.1248%, $Cr_2O_3$: 0.0233%, $V_2O_5$: 0.055%, $ZrO_2$: 1.3%, $TiO_2$: 2.96%, $SnO_2$: 0.31% and $As_2O_3+Sb_2O_3$: 0.083%.

Coefficient of Thermal Expansion

As noted above, one of the desired characteristics of the glass-ceramic is a coefficient of thermal expansion (CTE) of lower than about $15\times10^{-7}/K$, e.g., lower than about $10\times10^{-7}/K$ (measured between about 20° C. to about 700° C.). As shown in Table 5, the achieved CTE was indeed less than about $15\times10^{-7}/K$. Such a CTE, however, is higher than for beta-quartz glass ceramic material (which is generally obtained using lower ceramming temperatures). In general, beta-quartz glass ceramic material exhibits a CTE close to zero. It has been discovered that in order to obtain a CTE of less than about $15\times10^{-7}/K$, or less than about $11\times10^{-7}/K$, in a beta-spodumene glass-ceramic, the content of the $Na_2O$, $K_2O$ and/or CaO can be minimized as evidenced by comparing Examples 2 and 6.

Lightness L*

Additionally and/or alternatively, another of the desired characteristics of the glass-ceramic is a lightness L* between about 15-40, e.g., 20-40 or 25-40. By way of example, the lightness L* may be measured in reflection using a white background with illuminant D65 at 10° observer conditions. As illustrated in FIG. 1, it has been discovered that the glass-ceramic materials formed from the glass compositions of Table 4 and Table 1 will exhibit a lightness L* that varies as a function of ceramming temperature. Indeed, as shown in FIG. 1, Example 1 (labeled "1") shows that if the ceramming temperature is varied between about 950° C. to about 1060° C., the lightness L* values will vary from about 25 to about 45. The relationship between lightness L* and ceramming temperature is also exhibited in Examples 2 and 3 in FIG. 1. The increasing value of the lightness L* is caused by a resultant increase of the diffusion back-scattering of the light by the material arising from the increase of the ceramming temperature. Thus, using a ceramming temperature of less than about 950° C. produces a glass-ceramic material with a lightness L* of less than 25 and using a ceramming temperature of greater than 1060° C. produces a glass-ceramic that is too opaque, having a lightness of greater than 45.

Light Transmission Characteristics

Additionally and/or alternatively, other characteristics of the glass-ceramics are related to certain light transmission characteristics, which may be quantified, for example, using the known illuminant D65, 2° observer test on, for example, 4-5.5 mm thick samples. Such transmission characteristics include integrated visible transmission (Tl), which may be measured between about 380-780 nm; optical transmission measured at about 625 nm; optical transmission measured at about 950 nm; and/or infra-red optical transmission, which may be measured at about 1600 nm.

By way of example, the integrated visible transmission (Tl) may be one of: (i) between about 0.3% to about 6%; (ii) between about 0.4% to about 5%; (iii) between about 0.5% to about 5%; (iv) between about 0.6% to about 4%; (v) between about 0.7% to about 3%; (vi) between about 0.8% to about 2%; (vii) between about 0.3% to about 2%; (viii) between about 0.6% to about 1.7%; (ix) between about 1% to about 1.7%; and (x) between about 1.1% to about 1.6%. Notably, the range of 0.8% to about 2% is preferred when, for example, one wishes to permit an observer to see with some level of clarity, for example, heating elements glowing below a radiant cooktop without being distracted or overwhelmed by them. Indeed, in some embodiments it may be desirable to permit some level of light transmission for seeing through the glass-ceramic (e.g., for control panel displays), but not too much light transmission, e.g., providing limited clarity of vision at items behind the glass-ceramic. For instance, for low light transmittances, the heating elements (in particular of the radiant type) are not visible when they are in use, which presents safety problems. On the other hand, when the light transmittance is too high, the heating elements are visible even when not in use, which presents an esthetic problem.

It has been discovered that MnO, $Bi_2O_3$, $Fe_2O_3$, CoO, $Cr_2O_3$, NiO and $CeO_2$ may be used to tune the characteristic of the integrated visible transmission (Tl) of the glass-ceramic material. At least one of these oxides may be used to reach the desired value of the integrated visible transmission. Notably, the $Fe_2O_3$ content and the $V_2O_5$ content (although both are primarily employed for coloration) have a relationship to one another as concerns the integrated visible transmission (Tl). Indeed, it has been found that the amount of $Fe_2O_3$ may be increased in the composition as the $V_2O_5$ increases in order to obtain a material with an integrated visible transmission of greater than about 0.5%.

It has been found that in order to achieve the desired integrated visible transmission (Tl) of the glass-ceramic material, in addition to $Fe_2O_3$ and $Cr_2O_3$, at least one of the following oxides may be used: $V_2O_5$, CoO, NiO, MnO, $Bi_2O_3$ and $CeO_2$. Thus, as can be seen in Table 4, each sample includes at least one of the aforementioned oxides.

Additionally and/or alternatively, the optical transmission (measured at about 625 nm) may be one of: (i) higher than about 1%; (ii) higher than about 2%; (iii) higher than about 3%; (iv) higher than about 3.5%; (v) higher than about 4%; and (vi) higher than about 5%. For example, an optical transmission (at about 625 nm) of greater than about 2%, e.g., greater than about 3.5%, may be suitable for radiant cook-top applications. The optical transmission (at about 625 nm) is typically at most 5%. Additionally, such characteristic would permit one to see through the ceramic material in applications where there were red LEDs behind the material.

In some embodiments, such as when certain types of electronic controls are employed in a product (e.g., IR touch controls), it may be desirable to control the optical transmission (measured at about 950 nm). For example, the optical transmission (measured at about 950 nm) may be one of: (i) between about 35-75%; (ii) between about 50-70%; and (iii) between about 45-55%. Further example optical transmission ranges (measured at about 950 nm) include 50-75% and 55-70%. In addition to providing good performance for cooktop applications in general, the preferred range of between about 50%-70% would permit the use of infrared (IR) touch controls on a product, such as on a cooktop appliance.

Additionally and/or alternatively, the infra-red optical transmission (e.g., measured at about 1600 nm) may be one of: (i) between about 45-80%; (ii) between about 50-75%; and (iii) between about 45-60%. Further example IR transmission ranges (measured at about 1600 nm) include greater than 45%, i.e., 55-80% and 60-75%. An example range of between about 50%-75% provides good heating performance in a cooktop application. In a cooktop application, it has been found that an infra-red optical transmission of less than about 50% begins to show signs of reduced ability to heat an item placed thereon, and an infra-red optical transmission of more than about 75% can begin to show signs of excessive heating of materials located in proximity of, but outside, a desired heating zone.

Color Characteristics

As discussed above, an aspect of the embodiments herein are their color characteristics. Indeed, for commercial purposes it may be desirable to achieve a glass-ceramic having the aforementioned functional properties as well as certain coloration, specifically in the grey family, such as brown-grey.

Figure 2:
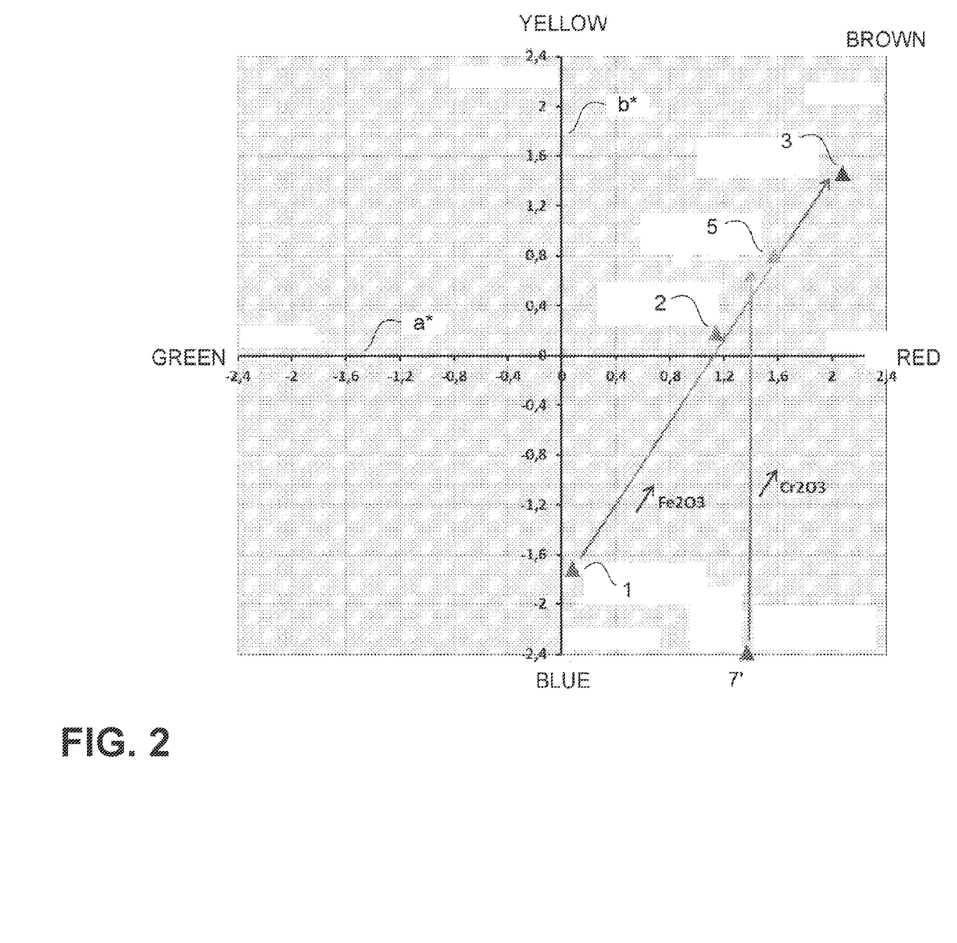
FIG. 2 is a chart illustrating the relationship between the blue-yellow hue and the green-red hue in glass ceramic materials as a function of the quantities of iron oxide ($Fe_2O_3$) and chromium oxide ($Cr_2O_3$) in accordance with one or more embodiments described and/or disclosed herein.

In this regard, reference is now made to FIG. 2, which is a graph on a Cartesian coordinate system illustrating the effect of certain coloring agents within the glass compositions of the embodiments herein. The y-axis (ordinate) represents the hue (b*), blue-yellow component of color, while the x-axis (abscissa) represents the hue (a*), green-red component of color. The color values on the graph may be quantified, for example, using the known illuminant D65, 10° observer test, which was used to measure color of the 4 mm thick and 5.2 mm thick samples herein. The a* and b* coordinates are typically measured simultaneously with the L* value.

The primary contributors to variations in the color of the resultant glass-ceramic are vanadium oxide ($V_2O_5$), chromium oxide ($Cr_2O_3$) or bismuth oxide ($Bi_2O_3$) or manganese oxide (MnO), and iron oxide ($Fe_2O_3$). This combination of coloring agents permits relatively high quantities of $Cr_2O_3$ and $Fe_2O_3$ without incurring significant cost insofar as iron and chromium are readily available at low cost.

$V_2O_5$, in the presence of $SnO_2$, significantly darkens the glass during ceramming, as $V_2O_5$ is responsible for absorption of light having wavelengths mainly below 700 nm. Yet, even in the presence of $V_2O_5$ and $SnO_2$ it is possible to retain sufficiently high optical transmission at 650 nm, 950 nm and in the infra-red optical transmission frequencies (e.g., 1600 nm). In accordance with embodiments herein, an amount of $V_2O_5$ may be one of: (i) between about 0% to 0.3%; (ii) between about 0.005% to 0.2%; (iii) between about 0.05% to 0.1%; (iv) between about 0.015% to 0.060%; (v) between about 0.015 to 0.050%; and (vi) between about 0.015% and 0.035%.

Chromium oxide ($Cr_2O_3$) has been found to be suitable for providing a darkening function of wavelengths within the visible range (e.g., between about 400-600 nm) while retaining high transmission in the wavelengths between about 600 and 800 nm. In accordance with embodiments herein, an amount of $Cr_2O_3$ may be one of: (i) between about 0.01% to 0.04%; (ii) between about 0.01% to 0.02%; (iii) between about 0.016% to 0.018%; (iv) between about 0.02% to 0.03%; (v) between about 0.015% to 0.035%; (vi) between about 0.02% to 0.035%; (vii) between about 0.015% to 0.025%; and (viii) between about 0.01% to 0.03%. Due to the presence of $Cr_2O_3$ in the composition, the glass-ceramic shows low transmission in the blue range.

Bismuth oxide ($Bi_2O_3$) may be used as an alternative or compliment to chromium oxide. The content by weight of $Bi_2O_3$ is within a range extending from 0.05 to 3.0%, in particular from 0.1 to 1.5%, 0.1 to 2.0%, 0.1 to 1.0%, indeed even from 0.2 or 0.3 to 0.5% or 1.0%.

Iron oxide ($Fe_2O_3$) leads to absorption mainly in the infra-red wavelengths; however, iron oxide is also involved in the visible wavelengths and affects the coloration of the glass-ceramic. In accordance with embodiments herein, an amount of $Fe_2O_3$ may be one of: (i) between about 0.12% to 0.4%; (ii) between about 0.15% to 0.35%; (iii) between about 0.16% to 0.25%; (iv) between about 0.07% to 0.12%; (v) between about 0.05% to 0.15%; and (vi) between about 0.05% to 0.4%. Notably, the effect of $Fe_2O_3$ within the listed compositions may be adjusted by varying the vanadium oxide content. For example, at $Fe_2O_3$ content greater than about 0.15%, transmission in the visible range is slightly increased (probably because $SnO_2$ preferentially reduces $Fe_2O_3$ and, as a consequence, the amount of reduced vanadium is lower). Such lightening of the glass-ceramic may then be compensated by a greater $V_2O_5$ content (however remaining within the range indicated above).

With reference still to FIG. 2, as the content of $Cr_2O_3$ is increased, the hue (b*) moves from negative levels (blue) to positive levels (yellow). Comparative Example 7 (labeled "7'") is depicted for illustration. As the content of $Fe_2O_3$ is increased, the hue (a*) moves from low positive levels (green) to higher positive levels (red), and the hue (b*) moves from negative levels (blue) to positive levels (yellow). A number of samples are shown on the illustrated plot. A first sample (labeled "1" and corresponding to Example 1 of Table 4) was of a base composition within the ranges discussed above, including 0.0173% $Cr_2O_3$ and 0.16% $Fe_2O_3$. Such a composition is clearly on the blue side of the coloration scale illustrated. A second sample (labeled "2" and corresponding to Example 2 of Table 4) was also of a base composition within the desired ranges, including 0.0173% $Cr_2O_3$ and 0.25% $Fe_2O_3$. The composition exhibited movement in both the yellow and red directions (i.e., towards brown) of the coloration scale illustrated. A third sample (labeled "5" and corresponding to Example 5 of Table 4) was also of a base composition within the desired ranges, including 0.021% $Cr_2O_3$ and 0.25% $Fe_2O_3$. The composition exhibited further movement in both the yellow and red directions of the coloration scale illustrated. A fourth sample (labeled "3" and corresponding to Example 3 of Table 4) was also of a base composition within the desired ranges, including 0.0173% $Cr_2O_3$ and 0.3% $Fe_2O_3$. The composition exhibited a coloration even closer to a red-brown. Taking the above into consideration, along with one or more other characteristics discussed above, in accordance with one or more desired embodiments, the hue (a*) may be one of: (i) between about 0 to +4; (ii) +0 to +3; (iii) +0 to +2; (iv) −3 to +3; and (v) −3 to +4. Additionally and/or alternatively, the hue (b*) may be one of: (i) between about −2 to +4; (ii) −1 to +3; (iii) 0 to +2; (iv) −10 to +3; and (v) −10 to +4.

In embodiments, the colorimetric coordinates observe at least one of the following inequalities, indeed even two or three of these inequalities:

$$20.0 \leq L^* \leq 30.0,$$

$$-1.5 \leq a^* \leq 1.5,$$

$$-5.0 \leq b^* \leq 1.0.$$

In further embodiments, the colorimetric coordinates observe at least one of the following inequalities, indeed even two or three of these inequalities:

$$15.0 \leq L^* \leq 40.0,$$

$$-3 \leq a^* \leq 4,$$

$$-10.0 \leq b^* \leq 4.0.$$

The colorimetric coordinates are calculated from a diffuse reflection spectrum, obtained using a spectrophotometer equipped with an integrating sphere, under perpendicular incidence and after subtraction of the specular reflection and of a baseline obtained by the same measurement carried out on Spectralon®.

With reference to Table 6 a number of samples were prepared having differing compositions as compared with the samples of Table 4. Table 7 is a table of characteristics of the glass-ceramic materials produced using the compositions of Table 6 after a glass ceramming process. It was found that the compositions of comparative examples 1, 2, 3, and 4 were undesirable because the level of $Fe_2O_3$ was too low and yielded unacceptable values of the integrated optical transmission (Tl). It was found that the composition of comparative example 5 was undesirable because it did not contain any $Cr_2O_3$ and therefore did not yield satisfactory coloration. A similar issue existed for comparative example 7 as it also did not contain any $Cr_2O_3$. With reference to FIG. 2, the data point for comparative example 7 is shown (see label number 7'), which exhibits a hue (b*) significantly toward blue. When a small amount of $Cr_2O_3$ is added (see Example 5 or Example 2 of Table 4), the color shifted toward positive values of hue (b*) as shown in FIG. 2 by label number 2 or label number 5. Comparative example 6 is undesirable because it does not include at least one of the oxides ($V_2O_5$, CoO, NiO, $Bi_2O_3$, MnO and $CeO_2$) and therefore does not exhibit satisfactory integrated optical transmission (Tl).

Within the scope of the disclosed embodiments, it is contemplated that the composition of the glass-ceramic contains, in addition to $Fe_2O_3$ and $Cr_2O_3$, at least one further coloring agent. However, it is important to keep in mind that the presence of one or more further coloring agents may have an influence on the targeted optical transmission characteristics discussed above. Therefore, attention should be paid to possible interactions, even with relatively low levels of such further coloring agents. For example, CoO may only be tolerable in very small amounts because CoO strongly absorbs light in the infra-red wavelengths and in a non-negligible way at wavelengths of about 625 nm.

Variations and Embodiments

Although the above discussion has been presented primary in terms of obtaining a glass-ceramic for a cooktop, skilled artisans will appreciate that the embodiments herein may be applied to many other products.

Although the above discussion has been primarily directed to glass compositions, and glass-ceramic properties, skilled artisans will appreciate that the discussion has been provided in significant detail to enable any number of methods and processes to fabricate such glass and glass-ceramic materials and resultant products. In essence, the base process steps may include the heat treatment of a vitrifiable load of raw materials under conditions which successively ensure melting, fining and then ceramming.

TABLE 6

| Oxides (weight %) | Comp. Example 1 | Comp. Example 2 | Comp. Example 3 | Comp. Example 4 | Comp. Example 5 | Comp. Example 6 | Comp. Example 7 |
|---|---|---|---|---|---|---|---|
| $SiO_2$ | 64.9 | 64.6 | 64.7 | 67.4 | 67.2 | 67.2 | 64.6 |
| $Al_2O_3$ | 20.8 | 20.8 | 20.8 | 19.2 | 19.2 | 19.2 | 20.8 |
| $Li_2O$ | 3.8 | 3.8 | 3.8 | 3.5 | 3.5 | 3.5 | 3.8 |
| MgO | 0.35 | 0.35 | 0.35 | 1.3 | 1.3 | 1.3 | 0.35 |
| ZnO | 1.5 | 1.5 | 1.5 | 1.7 | 1.7 | 1.7 | 1.5 |
| BaO | 2.5 | 2.5 | 2.5 | 1.8 | 1.8 | 1.8 | 2.5 |
| $TiO_2$ | 3 | 3 | 3 | 3 | 3 | 3 | 3 |
| $ZrO_2$ | 1.4 | 1.4 | 1.4 | 1.4 | 1.4 | 1.4 | 1.4 |
| $SnO_2$ | 0.3 | 0.35 | 0.35 | 0.35 | 0.35 | 0.35 | 0.35 |
| $K_2O$ | 0.25 | 0.25 | 0.25 | 0.1 | 0.1 | 0.1 | 0.25 |
| $Na_2O$ | 0.6 | 0.6 | 0.6 | 0.2 | 0.2 | 0.2 | 0.6 |
| CaO | 0.4 | 0.4 | 0.4 | | | | 0.4 |
| $V_2O_5$ | 0.057 | 0.167 | 0.167 | 0.027 | 0.027 | | 0.167 |
| CoO | 0.0013 | 0.0013 | 0.0013 | | | | 0.0013 |
| $Fe_2O_3$ | 0.094 | 0.037 | 0.037 | 0.037 | 0.250 | 0.250 | 0.250 |
| $Cr_2O_3$ | | 0.0173 | 0.0173 | | | 0.02 | |
| NiO | | 0.25 | | | | | |
| $CeO_2$ | | | 0.15 | | | | |

TABLE 7

| Properties | | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|
| Ceraming temperature | | 1035° C. | 1035° C. | 1035° C. | 1050° C. | 1050° C. | 1030° C. | 1035° C. |
| CTE ($\times 10^{-7}$/° C.) | | | | | | | 9 | |
| Reflected Color Thickness 5.2 mm | L* | 34.74 | 27.63 | 27.71 | 27.35 | 34.42 | 37.04 | 34.04 |
| | a* | 0.51 | 0.49 | 0.43 | 2.19 | 1.02 | 1.63 | 1.07 |
| | b* | −0.92 | −3.16 | −1.72 | 11.31 | −9.08 | 5.18 | −2.05 |
| Reflected Color Thickness 4 mm | L* | 35.96 | 27.53 | 28.46 | | | | 35.09 |
| | a* | −0.5 | 0.61 | 0.33 | | | | 1.37 |
| | b* | −1.54 | −2.89 | −1.78 | | | | −2.39 |
| Transmission (%) | Tl | 0.36 | 0.01 | 0.05 | | | | 1.22 |
| | 625 nm | 1.54 | 0.02 | 0.24 | | | | 5 |
| | 950 nm | 58.39 | 20.54 | 45.1 | | | | 52.24 |
| | 1600 nm | 68.96 | 22.85 | 73 | | | | 52.41 |

The load is a precursor of a glass for producing the glass-ceramic materials discussed above, advantageously having the base composition specified above.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

The invention claimed is:

1. A method, comprising:
    melting a load of vitrifiable raw materials;
    fining the load to obtain molten glass;
    cooling the molten glass to a temperature sufficient to shape it into a desired shape; and
    ceramming of the glass in the desired shape at a maximum temperature between about 960° C. to about 1060° C., to produce a lithium aluminosilicate glass-ceramic material containing beta-spodumene as a predominant crystalline phase, wherein the glass-ceramic material comprises:
    60-72% $SiO_2$, 18-23% $Al_2O_3$, and 2.5-4.5% $Li_2O$; and 0.05-0.20% $V_2O_5$, 0.15-0.30% $Fe_2O_3$, 0.015-0.030% $Cr_2O_3$, 0-0.05% CoO, 0-0.3% NiO, and 0-0.2% $CeO_2$;
    wherein the glass-ceramic material, exhibits a brown-grey color with an optical transmittance for a wavelength of 62.5 nm of greater than 2.0% as measured using an illuminant D65, 2° observer test on 4 mm thick glass-ceramic.

2. The method of claim 1, wherein at least one of:
    a green-red hue (a*) of the glass-ceramic is between about −3 to +4,
    a blue-yellow hue (b*) of the glass-ceramic is between about −10 to +4, and
    said hue is measured in reflection using an illuminant D65, 10° observer test.

3. The method of claim 1, wherein a lightness L* of the glass-ceramic is between about 15-40 measured in reflection using an illuminant D65, 10° observer test.

4. The method of claim 1, wherein an integrated visible transmission (Tl) of the glass-ceramic is between about 0.3% to about 6%, wherein said integrated visible transmission (Tl) is measured using an illuminant D65, 2° observer test on 4 mm thick glass-ceramic.

5. The method of claim 1, wherein an optical transmission of the glass-ceramic, measured at about 625 nm, is higher than about 3.5%, and wherein said optical transmission is measured using an illuminant D65, 2° Observer test on 4 mm thick glass-ceramic.

6. The method of claim 1; wherein an optical transmission of the glass-ceramic, measured at about 950 nm, is between about 35-75%, and, wherein said optical transmission is measured using an illuminant D65, 2° observer test on 4 mm thick glass-ceramic.

7. The method of claim 1, wherein an infra-red optical transmission of the glass-ceramic, measured at about 1600 nm, is greater than 45%, wherein said optical transmission is measured using an illuminant D65, 2° observer test on 4 mm thick glass-ceramic.

8. The method of claim 1, wherein the glass-ceramic material is substantially free of $As_2O_3$ and $Sb_2O_3$.

9. The method of claim 8, wherein the glass comprises (in weight %): 0-2.5% $ZrO_2$, and 1.5-4% $TiO_2$.

10. The method of claim 8, wherein the glass comprises (in weight %): 0-3% MgO, 0-3% ZnO, BaO, 0-2% CaO, 0-1.5% $K_2O$, 0-1.5% $Na_2O$.

11. The method of claim 8, wherein the glass comprises (in weight %): 0-0.6% $SnO_2$.

* * * * *

UNITED STATES PATENT AND TRADEMARK OFFICE
CERTIFICATE OF CORRECTION

PATENT NO. : 10,160,685 B2  
APPLICATION NO. : 15/416034  
DATED : December 25, 2018  
INVENTOR(S) : Marie Jacqueline Monique Comte et al.

Page 1 of 1

It is certified that error appears in the above-identified patent and that said Letters Patent is hereby corrected as shown below:

On the Title Page

In Column 1, item (72), Inventors, Line 3, delete "Paris" and insert -- Asnières sur Seine --, therefor.

In Column 1, item (72), Inventors, Line 5, delete "Courbevoie" and insert -- Paris --, therefor.

In the Claims

In Column 17, Line 27, Claim 1, delete "material," and insert -- material --, therefor.

In Column 17, Line 29, Claim 1, delete "62.5" and insert -- 625 --, therefor.

In Column 18, Line 15, Claim 5, delete "Observer" and insert -- observer --, therefor.

In Column 18, Line 17, Claim 6, delete "1;" and insert -- 1, --, therefor.

In Column 18, Line 19, Claim 6, before "wherein" delete "and,".

In Column 18, Line 31, Claim 10, delete "BaO," and insert -- 0-5% BaO, --, therefor.

Signed and Sealed this  
Fourteenth Day of April, 2020

Andrei Iancu  
*Director of the United States Patent and Trademark Office*